Figure 1:
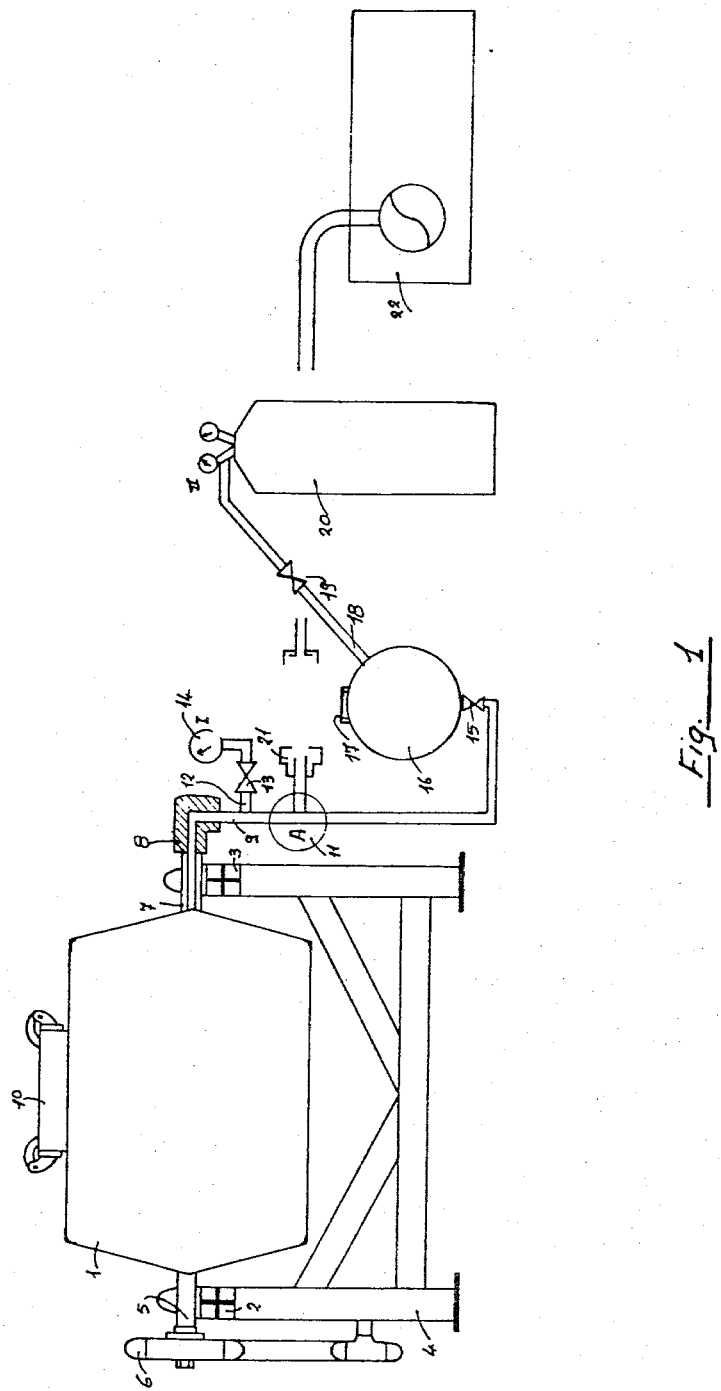

United States Patent [19]

Dreano et al.

[11] 4,229,458

[45] Oct. 21, 1980

[54] METHOD OF PICKLING PIECES OF MEAT

[75] Inventors: Claude Dreano, Guilliers; André Noyelle, Muizon, both of France

[73] Assignee: Armor-Inox S.A., Mauron, France

[21] Appl. No.: 900,244

[22] Filed: Apr. 26, 1978

[30] Foreign Application Priority Data

Apr. 27, 1977 [FR] France ................................ 77 13471

[51] Int. Cl.² .......................... A23B 4/02; A23L 1/27; A23L 1/31
[52] U.S. Cl. ................................... 426/264; 426/281; 426/641; 426/647; 426/652
[58] Field of Search ............... 426/262, 264, 281, 641, 426/645, 647, 652, 519, 524, 331, 332; 99/467, 472, 535

[56] References Cited

U.S. PATENT DOCUMENTS

| | | | |
|---|---|---|---|
| 96,978 | 11/1869 | Sherwood | 426/641 |
| 248,793 | 10/1881 | Richardson | 426/641 |
| 474,446 | 5/1892 | Fey | 99/535 |
| 2,629,311 | 2/1953 | Graves | 426/281 X |
| 3,220,854 | 11/1965 | Zwart | 426/641 X |

FOREIGN PATENT DOCUMENTS

| | | | |
|---|---|---|---|
| 7424196 | 6/1976 | France | 426/641 |
| 7533343 | 2/1978 | France | 426/264 |
| 374611 | 6/1932 | United Kingdom. | |
| 431994 | 8/1935 | United Kingdom. | |

*Primary Examiner*—Arthur L. Corbin
*Attorney, Agent, or Firm*—Laff, Whitesel & Rockman

[57] ABSTRACT

A meat pickling method whereby meat pieces are placed in a container with brine, the container is pressurized with nitrogen gas and rotated. Subsequently, a vacuum is applied to the interior of the container and then the container is swept with nitrogen gas. Atmospheric pressure is then established in the container, the rotation stopped and the meat removed.

5 Claims, 2 Drawing Figures

METHOD OF PICKLING PIECES OF MEAT

The present invention concerns a method of pickling and curing pieces of meat and in particular pieces of pork meat, such as hams, for example.

At present, the pickling of pieces of meat is effected either by intravenus or intra-arterial injection of brine or by intermuscular injection of the brine. The injection through the veins or the arteries uses the existing system of blood vessels and capillaries in the piece of meat, and a relatively uniform distribution of the brine throughout the piece of meat is ensured. However, this injection can only be effected manually because it is necessary to introduce the injection syringe of the brine at the entry of a large vessel, vein or artery which has to be found in the mass of flesh. It is necessary to prepare the outer edges of that vein or artery to obtain an efficacious injection.

In the manual intramuscular injection by syringe or by a set of syringes mounted on an automatic machine the duration of the operation is substantially reduced and a good distribution of the brine is obtained by multiplying the number of syringes of one set. However, the intramuscular injection has a certain number of drawbacks. First of all, the muscles deteriorate mechanically if pierced by a set of relatively closely spaced needles, as they are when they have been subjected to the action of a tenderiser. The fibers are cut and the muscle becomes placid. Furthermore, the needles bring along with them a part of the blood liquid initially retained in the muscle and on the outside of the muscle. The operation being rapid, the brine is always applied in excess and it is necessary to provide for the recovery of this excess of brine for subsequent reuse. However, as the recovered brine contains a non-negligable quantity of blood liquid expelled from the muscle in the course of the operation over, for example, the working day, the brine is enriched generally with blood liquid. The last pickled pieces do not have the same composition as the first, which does not result in products of vigorously constant quality.

After pickling according to one of the known methods as disclosed above, it is also necessary to mix the pieces to obtain an almost uniform distribution of the brine in each piece of meat. In particular, in intramuscular injection, the injected brine will remain, without mixing, in limited regions around the injection hole. This mixing operation may be effected, for example, in a mixer with rotating arms such as described in the published French patent application No. 2288472 or in a massager of the rotary bar, horizontal axle type.

Furthermore, it will be remembered that all of these operations for injecting brine and mixing pieces must be carried out at temperatures not exceeding +4 degrees centigrade.

One object of the present invention, at least in its preferred form, provides a method of pickling meat in pieces which obviates the drawbacks of the conventional methods mentioned above.

Another object of the present invention, in its preferred form, provides a method of pickling which reduces the time of the operations of preparation of the meats, such as hams in pieces or complete hams, by combining the pickling and the mixing.

Another object of the invention, in its preferred form, also provides a method of dry curing which treats the hams in pieces or complete with the method of pickling of the invention.

According to one feature of the invention there is provided a method of pickling in which the pieces of meat to be pickled are placed in a container capable of turning about a horizontal axle and which comprises the following operations;

(a) putting the container into rotation;
(b) applying a vacuum to the inside of the container;
(c) adding to the container a quantity of brine corresponding to the mass of pieces of meat to be pickled;
(d) pressurising the inside of the container with an inert or neutral gas, and after a predetermined time;
(e) re-establishing normal pressure in the container, and stopping its rotation before opening it.

According to another feature, there is provided a method of pickling or dry curing in which, instead of adding the liquid brine after putting the container under vacuum, salt is added directly, in a quantity corresponding to the mass of pieces of meat to be pickled before putting the container in rotation.

According to another feature, after a certain time, following pressurization of the container, the pressure of inert or neutral gas is reduced to a level below the atmospheric pressure and is then increased again. This cycle of lowering and raising the pressure is repeated several times. According to another feature, the inert or neutral gas is nitrogen. According to another feature, the pressure in the container does not exceed 2.9 bar.

Figure 2:
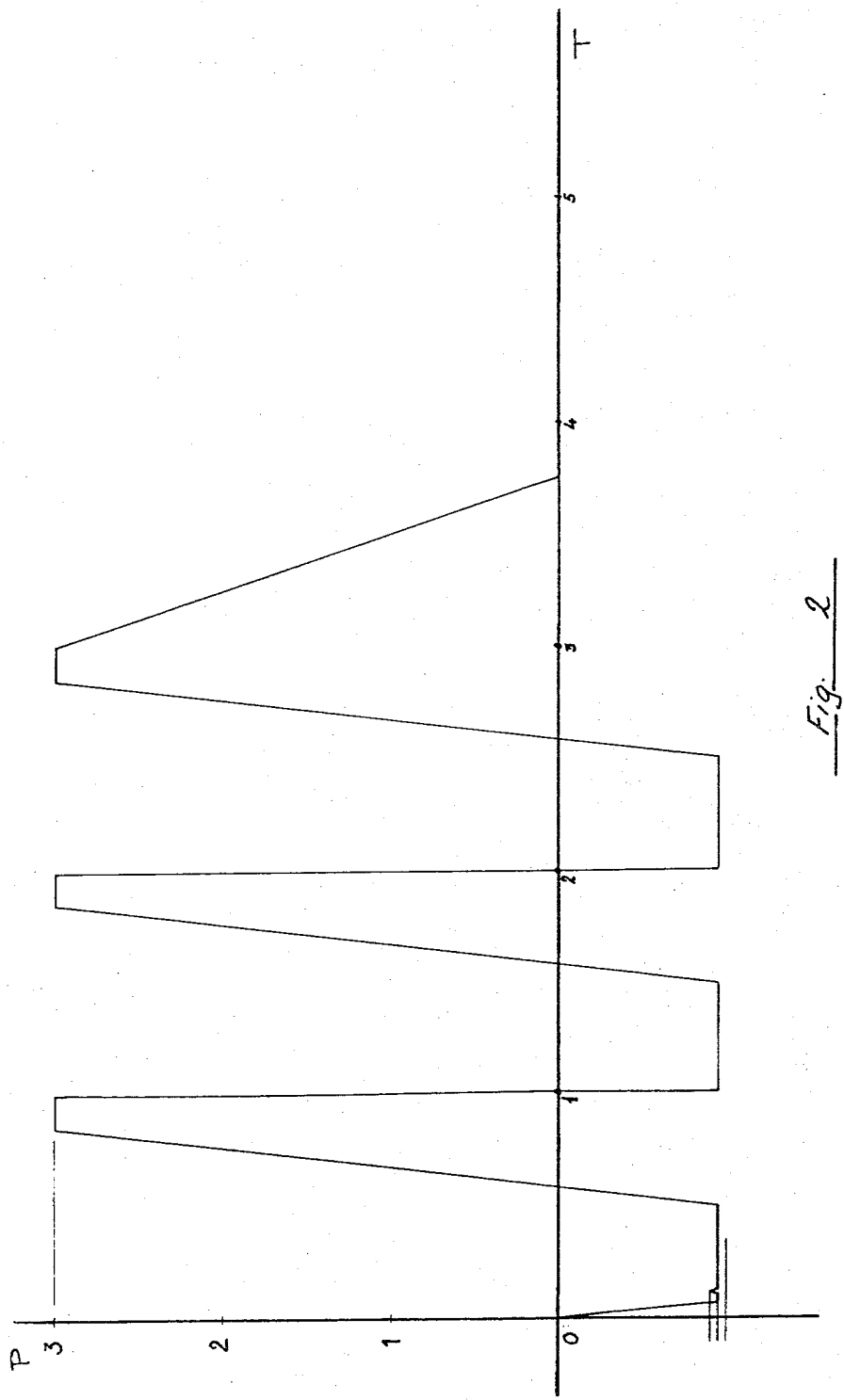

The features of the invention mentioned above as well as others will appear more clearly on reading the description of one embodiment of the inventive method, the description being made in relation to the attached drawings, amongst which:

FIG. 1 is a diagrammatic view of equipment intended for putting into operation the preferred method of the invention, and FIG. 2 is a pressure-time diagram illustrating the operation of the equipment of FIG. 1.

The equipment of FIG. 1 comprises a container 1 of the churn type, of a generally cylindrical form, mounted on roller bearings 2 and 3 which, in turn, are mounted on the uprights of a support frame 4. The axle 5, integral with the churn 1, is driven by a toothed wheel 6 which is itself driven by a motor and belt drive. The axle 7, aligned with the axle 5, and likewise integral with the churn 1 is hollow to form a conduit leading into the churn and is provided with a rotating hollow joint 8, conected to a fixed conduit 9. The churn 1 comprises also an air-tight door 10 capable, when closed, of supporting inside the churn 1 either a vacuum or an overpressure. For obvious reasons of safety, the over pressure in the churn 1 is preferably limited to a maximum of a little below 3 bars.

The conduit 9 connects the rotating joint 8 to a first orifice of a three way valve 11 and has a branch 12 on which is mounted a stop valve 13 provided with a pressure gauge 14. A second orifice of the valve 11 is connected by means of a stop valve 15 to balloon shaped container 16 which serves as a brine tank. The balloon shaped container 16 has a filling lid 17 and is connected by means of a conduit 18 and by means of a valve 19 to the outlet of a bottle 20 of nitrogen (or other neutral gas).

In addition, the third orifice of the valve 11 is connected to a part of vacuum tap 21, the second part of which is connected to the inlet of a vacuum pump 22.

Initially, the valve 13 is closed, the three way valve 11 has all its orifices communicating with one another, the valve 15 is closed and the valve 19 is closed. The door 10 is opened to pour into the churn 1 a mass of pieces of meat which is to be pickled. Then, the door 10 is closed. The lid 17 is opened in order to pour into the balloon shaped container 16 a mass of brine ideally corresponding exactly to the mass of pieces of meat enclosed in churn 1 according to the degree of pickling desired. In practice the mass of brine will probably be slightly more or less than optimum, although it is desirable that any quantity less than optimum should be avoided before completely re-closing the lid 17. The valve 19 is slightly opened to drive out the air from container 16, above the level of the brine and to replace it by the nitrogen. Lid 17 and valve 19 are closed, and the churn 1 is set into rotation.

The two parts of the vacuum tap 21 are coupled. A vacuum is drawn in the churn 1 and the conduits connected at valve 11, by causing the vacuum pump 22 to operate. When the desired vacuum is obtained, the valve 11 rotates to close the third orifice and leave connected to one another only the first and the second orifices, that is to say the connection between churn 1 and the valve 15 is allowed to remain. The vacuum top 21 is unplugged. The valve 15 is opened so that the brine from the balloon shaped container 16 is drawn into the churn 1. The valve 19 is opened to introduce the nitrogen under pressure into the churn 1 while sweeping through the balloon shaped container 16 and the conduits connecting the churn. Simultaneously the valve 13 is closed to control the pressure level of the nitrogen in the churn.

When the desired level of pressure is reached, the valves 15 and 19 are closed. After a predetermined time, valve 11 is turned to cause the pressure of the gas in the churn 1 to drop by allowing the gas to exhaust through the open part of vacuum top 21. The design of top 21 is such as to allow the exhaust of gas from the churn 1 but not the entry of air into the churn. The lowering of pressure in churn 1 is observed with the aid of the pressure gauge 14.

The valve 13 is then closed and two parts of the vacuum top 21 are coupled again to cause a vacuum in the churn 1, again by using the vacuum pump 22. After a certain time, the valve 11 is opened again to again interconnect the churn 1 and the balloon shaped container 16. The valves 15 and 19 are opened to admit again the nitrogen under pressure into the churn. The pressure is controlled by gauge 14, the valve 13 being open. Valves 15 and 19 are then re-closed. The operations of lowering pressure and increasing pressure are renewed to finish off the penetration of the brine into the meat, before finally opening the interior of the churn to free air. At this moment, the door 10 is opened and the pieces of pickled meat are collected.

In the course of experiments carried out on normal quantities of meat and brine, it has appeared that with the cycle of operations as described above, and with the durations indicated in the pressure-time diagram of FIG. 2, a perfectly homogeneous pickling is obtained. It will be observed, in examining FIG. 2, that each vacuum pressure cycle lasts about 1 hour, the last cycle being preferably longer with a slower drop in pressure. It is obvious that the number of cycles may be modified if necessary. It is likewise interesting to find that the duration of treatment is on the order of 4 hours which is very much reduced with respect to the duration of the treatment which is necessary with the traditional method. Furthermore, one does not obtain, with the present conventional methods, the same high degree of homogeneous pickling which is achieved with the method of the invention. At the opening of the churn, at the end of the treatment one may find that not very much brine liquid remains, and that the pieces of meat are dry. As a result, there is no loss of brine as in the conventional methods.

The method of the invention, which has been described above by way of example is likewise useable for the pickling products called "dry" in the language of picklers that is for the manufacture of raw hams. At present, this pickling is effected in the following manner. The first operation consists of a manual rubbing the ham with salt. The rubbed meat is next stored in a cold room storing, in a salting tub, the ham being immersed in the salt for about 12 days. Finally, the ham undergoes an operation of maturing in a cold chamber for about 10 days.

Now there has been effected, in the apparatus described above, curings of hams by applying alternate cycles of vacuum and pressure operations. One has been able to find upon the pickled hams, an almost perfect curing. For the preparation of dry pickled products, there is a very considerable the gain in time, with method of the invention.

Furthermore, the inventive method obeys all the hygiene rules by avoiding any manual action.

As regards the apparatus which has been described above, it is of course to be understood that it may be modified without departing from the scope of the invention. Thus, as a measure of economy, instead of allowing the nitrogen to escape into the air, between two cycles, it may be re-compressed with the aid of a compressor and then re-utilised in the following cycle. One may transfer the re-compressed nitrogen into a second churn at the mid point of the cycle of the first churn and cause them to operate at opposite pressures.

To avoid any risk of heating during the pickling treatment, one may likewise equip the working container with a cooling system by a double refrigerated jacket or by direct injection into the container of cold or liquified gas.

Instead of nitrogen one may likewise use another inert or neutral gas which does not have any harmful action on the meat.

The principles of the invention have been described above in relation to particular examples for putting into operation the method of the invention. However it must be understood that the description has been given only by way of example and does not limit the scope of the invention except as defined by the appended claims.

What we claim is:

1. A pickling method comprising the steps of:
   a. placing in a container pieces of meat to be pickled, said container being mounted for turning about a horizontal axle whereby said meat tumbles into and out of any fluid which may be in the bottom of said container;
   b. adding to the said container a quantity of liquid brine which corresponds to the mass of the pieces of meat to be pickled, whereby said meat and brine rest on the bottom of said container when said container is stationary and tumble while said container rotates about said horizontal axle;
   c. pressurizing the container with an inert nitrogen gas to a pressure greater than atmospheric pressure and less than 3 bars, whereby space within said container which is not filled with said brine is a pressurized atmosphere of nitrogen;
d. rotating the container;
e. applying a vacuum to the interior thereof;
f. sweeping the container with an inert nitrogen gas; and then
g. reestablishing atmospheric pressure in the container after a predetermined time and stopping said rotation before opening the container.

2. A pickling method comprising the steps of:
a. placing in a container pieces of meat to be pickled, said container being mounted for turning about a horizontal axle whereby said meat tumbles into and out of any fluid which may be in said container;
b. adding dry salt to the interior of the container in a quantity which corresponds exactly to the mass of pieces of meat to be pickled before putting the container in rotation;
c. pressurizing the container with an inert nitrogen gas to a pressure greater than atmospheric pressure and less than 3 bars, whereby space within said container remaining above said brine is a pressurized atmosphere of nitrogen;
d. rotating the container;
e. applying a vacuum to the interior thereof;
f. sweeping the interior of the container with an inert nitrogen gas; and then
g. reestablishing atmospheric pressure in the container after a predetermined time and stopping said rotation before opening the container.

3. A pickling method according to claim 1 or 2, wherein, after a certain time following the pressurizing of the container with the inert nitrogen gas, said pressure is reduced below atmospheric pressure and thereafter is increased to again pressurize said container, this cycle of lowering and increasing pressure being repeated several times.

4. A pickling method according to claim 3 wherein each cycle lasts about one hour.

5. A pickling method according to one of the claims 1 or 2 wherein the container is cooled for the duration of the treatment.

* * * * *